(12) United States Patent
Corral

(10) Patent No.: US 10,574,283 B2
(45) Date of Patent: Feb. 25, 2020

(54) TSF SMARTPHONE CASE

(71) Applicant: William Samuel Corral, Studio City, CA (US)

(72) Inventor: William Samuel Corral, Studio City, CA (US)

( * ) Notice: Subject to any disclaimer, the term of this patent is extended or adjusted under 35 U.S.C. 154(b) by 0 days.

(21) Appl. No.: 15/844,848

(22) Filed: Dec. 18, 2017

(65) Prior Publication Data

US 2018/0212639 A1    Jul. 26, 2018

Related U.S. Application Data

(60) Provisional application No. 62/435,278, filed on Dec. 16, 2016.

(51) Int. Cl.
| | |
|---|---|
| *H04M 1/00* | (2006.01) |
| *H04B 1/3888* | (2015.01) |
| *H04M 1/02* | (2006.01) |
| *A45C 11/00* | (2006.01) |
| *H04M 1/11* | (2006.01) |
| *A45F 5/00* | (2006.01) |

(52) U.S. Cl.
CPC ............ *H04B 1/3888* (2013.01); *A45C 11/00* (2013.01); *H04M 1/0202* (2013.01); *H04M 1/11* (2013.01); *A45C 2011/002* (2013.01); *A45C 2200/15* (2013.01); *A45F 2005/008* (2013.01); *A45F 2200/0516* (2013.01); *H04M 2250/52* (2013.01)

(58) Field of Classification Search
CPC .............. A45C 11/00; A45C 2011/002; A45C 2200/15; A45F 2005/008; A45F 2200/0516; H04B 1/3888; H04M 1/0202; H04M 1/11; H04M 2250/52
See application file for complete search history.

(56) References Cited

U.S. PATENT DOCUMENTS

| | | | |
|---|---|---|---|
| 2003/0089832 A1* | 5/2003 | Gold | A45F 5/02 248/454 |
| 2014/0299488 A1* | 10/2014 | Andrew | A45C 13/002 206/37 |

\* cited by examiner

*Primary Examiner* — Xin Jia

(57) ABSTRACT

A protective case is provided to protect a portable electronic device and allow for more dexterous and stable operation of a camera associated with the portable electronic device. Preferably this case includes a securing portion whereby the user's hand may be inserted into the case to securely hold and control the portable electronic device via the case when operating the device with a single hand. This has the advantage of reducing the risk of dropping the device and allowing a user to brace for a fall or other accident with reduced concern for the safety of the personal electronic device, as it is less likely to be dislodged from the user's hand when in an operable position.

6 Claims, 4 Drawing Sheets

US 10,574,283 B2

TSF SMARTPHONE CASE

CROSS REFERENCE TO RELATED APPLICATIONS

This application claims the benefit of U.S. Provisional Application No. 62/435,278, filed Dec. 16, 2016.

STATEMENT REGARDING FEDERALLY SPONSORED RESEARCH OR DEVELOPMENT

Not Applicable

BACKGROUND OF THE INVENTION

The present invention relates to an improved protective case for a portable electronic device with camera functionality that allows for steady operation of the camera with a single hand.

As the value of and function of portable electronic devices has increased, individuals have desired to protect their electronic devices using a protective case. Most portable electronic devices in use today include a camera.

As the camera technology on personal electronic devices has improved, large numbers of amateur, semi-professional, and even professional photographers and videographers have been turning to their personal electronic devices for shooting photos and videos. Many users use a single hand to use the camera while walking, running, or otherwise while in motion. To activate and use the camera often requires dexterous control with a single hand that risks severe damage to the portable electronic device if a user's hand slips or if the portable electronic device in the case is dropped, particularly while in motion.

Therefore, a protective case is needed that has the ability to protect the portable electronic device and allow for more dexterous and stable operation of a camera associated with the portable electronic device. Preferably this case includes a securing portion whereby the user's hand may be inserted into the case to securely hold and control the portable electronic device via the case when operating the device with a single hand. This has the advantage of reducing the risk of dropping the device and allowing a user to brace for a fall or other accident with reduced concern for the safety of the personal electronic device, as it is less likely to be dislodged from the user's hand when in an operable position.

SUMMARY OF THE INVENTION

In a protective case for a portable electronic device embodying the principles of the invention, the protective case includes a securing portion to accommodate a user's hand, preferably with available room for one to four digits, allowing at least the user's thumb to operate the portable electronic device while all or some of the remainder of the user's hand is securely contained within a securing portion, thereby providing more dexterous control of the portable electronic device in a variety of positions.

This allows for safe and comfortable movement of the device within the user's hand, allowing for flexibility of lateral movements (up and down or side to side) when the camera within the device is functioning as a still camera or video camera. This allows for the device to be used as a camera with the user's arm providing a stable base, or counterweight, for capturing stable photos or videos.

The securing portion on the protective case is comprised of a flap or pocket and may be formed in a variety of different embodiments on the back of the protective case with dimensions to allow for the insertion of all or part of a user's hand to be securely retained within the flap or pocket.

As such, the protective case functions similar to a conventional protective case when ordinarily used, but allows for a user to comfortably and easily use the securing portion of the protective case to insert a hand for safe and dexterous operation of the personal electronic device, particularly its camera functionality.

Furthermore, the securing portion may also be used as a stand for viewing photos, or videos or listening to music or making phone calls from the device, when it is not in use as a stabilizing handheld feature.

A portion of the case may be extended outward to provide for a handle with which to take photographs, particularly self-portraits.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention, by way of example, and together with the description serve to further explain the principles of the invention. The drawings are not intended nor do they represent an exhaustive encapsulation of the invention. Other aspects of the invention and the advantages of the invention will be better appreciated as they become better understood by reference to the Detailed Description when considered in conjunction with accompanying drawings, and wherein:

DETAILED DESCRIPTION OF THE INVENTION

Figure 1A:
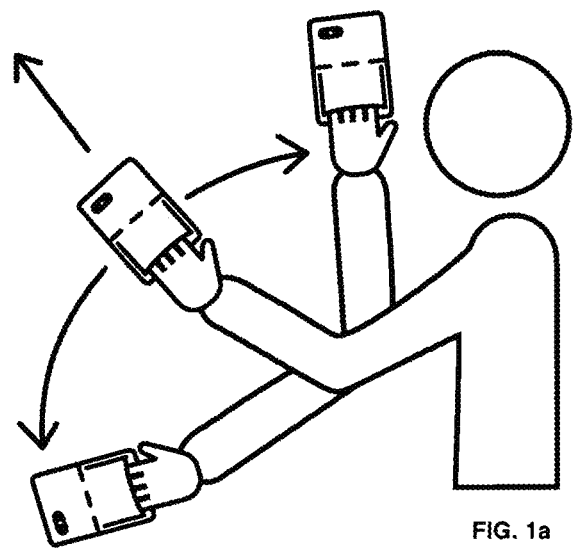
FIGS. 1a-1c depict the present invention in use by a user.
Figure 1B:
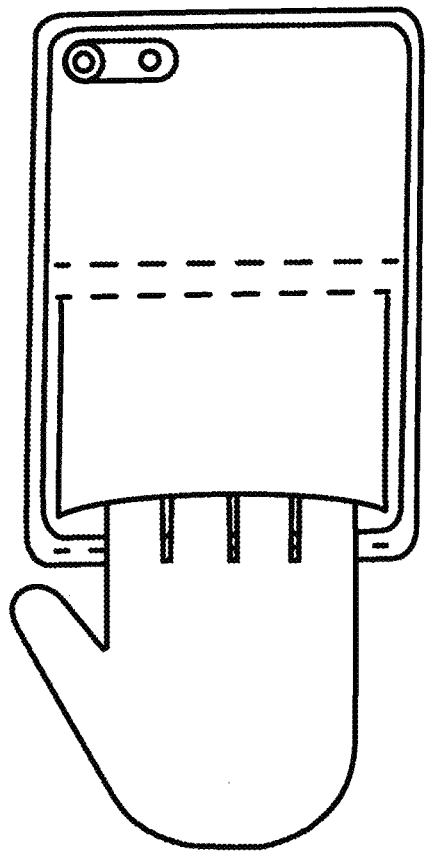
Figure 1C:
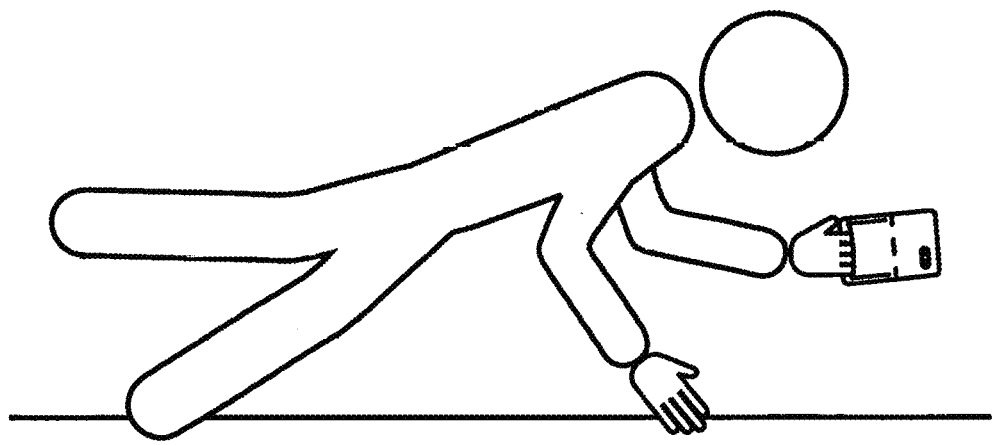
Figure 2:
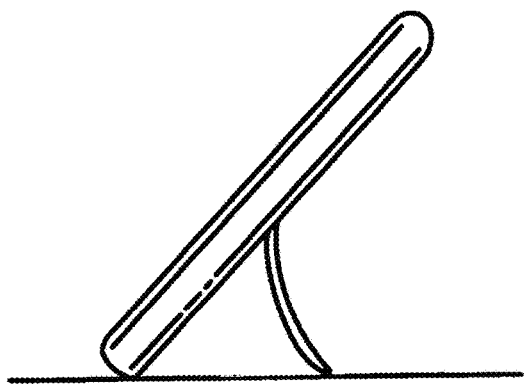
FIG. 2 depicts the present invention in use as a stand for a personal electronic device.
Figure 3:
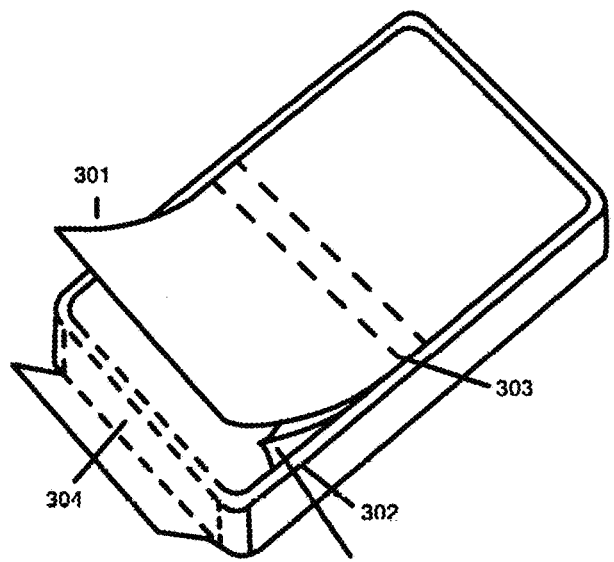
FIG. 3 is an isometric view of a back portion of the protective case for a personal electronic device with the securing portion open, according to the present invention.
Figure 4:
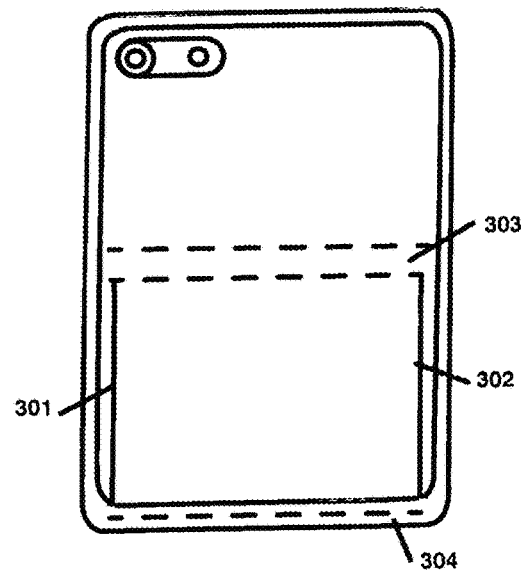
FIG. 4 is an isometric view of a back portion of the protective case for a personal electronic device with the securing portion closed, according to the present invention.
Figure 5:
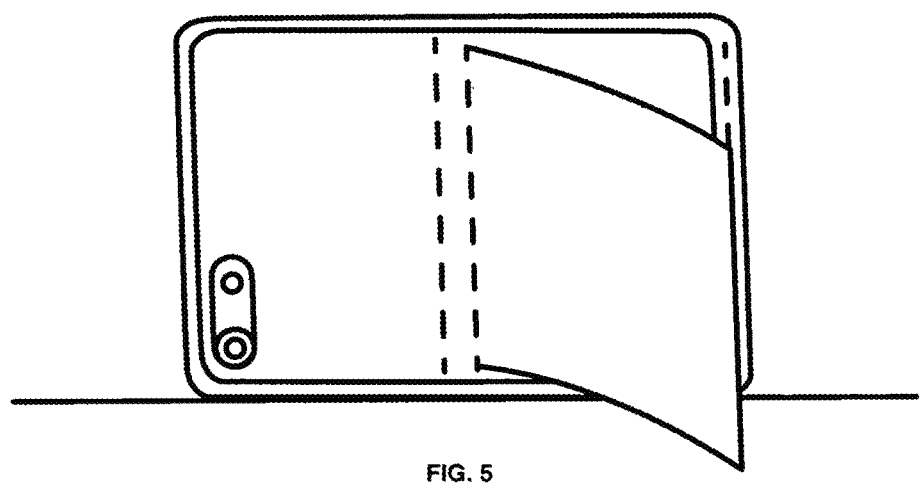
FIG. 5 is a side view of the protective case for a personal electronic device with the securing portion open, according to the present invention.
Figure 6:
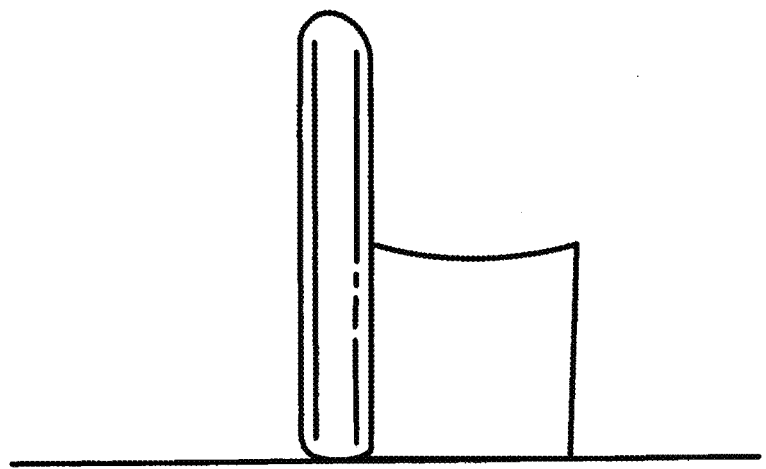
FIG. 6 is a side view of the protective case for a personal electronic device with the securing portion closed, according to the present invention.

Referring now to FIGS. 1-6, a protective case 10 for a portable electronic device 20 is disclosed. The protective case 10 is comprised of a front portion 100, a back portion 200, a left side portion 201, a right side portion 202, a top end portion 203, and a bottom end portion 204 encapsulating the portable electronic device 20. The front portion 100 enclosing the front edges of the portable electronic device 20 and allowing a user of the device 20 access to the display and user input areas of the portable electronic device 20.

The back portion 200 encloses the back of the portable electronic device 20. The left side portion 201 and the right side portion 202 partially enclose the left and right sides of the portable electronic device 20. The top end portion 203 and the bottom end portion 204 partially enclose the top end and the bottom end of the portable electronic device 20. The left side portion 201, the right side portion 202, the top end portion 203, and the bottom end portion 204 extend between the back portion 200 and the front portion 100 attaching the front portion 100 to the back portion 200. The left side portion 201, the right side portion 202, the top end portion 203, and the bottom end portion 204 allow access to all of the necessary components of the portable electronic device 20, such as the volume buttons, accessory attachment points, input ports, power buttons, and headphone jacks, etc.

The back portion 200 includes a flap or pocket 300 formed by three slits in the back portion 200: a first generally vertical slit 301 adjacent the left side portion 201, a second generally vertical slit 302 adjacent the right side portion 202, and a third generally horizontal slit 304 adjacent the bottom end portion 204. The vertical slits 301 and 302 extend only partway up the back portion 200 of the protective case 10, preferably no more than half way up the back portion 200. The vertical slits 301 and 302 terminate at an upper end in a reinforced portion 303 of the back portion 200 of the casing. The reinforced portion 303 may be composed of a material with greater modulus of elasticity than the remainder of the back portion 200 or of the same material but having a greater thickness than the remainder of the back portion 200, or a combination of both.

At least the back portion 200, and preferably the entire case 10, is made of an elastic material so that the pocket 300 may change in size to accommodate a variety of user's hands sizes or other components the user may elect to store within the pocket 300, such as a tool, a set of tweezers, a toothpick, a lens cleaning cloth, a set of earphones, a telephonic head/speaker set, a flash drive, a laser pointer, a health monitoring item, a medical item, an office product, a cosmetic product, a pharmaceutical product, a candy product, a hygiene product, a spice, a sweetener, a condiment, a cleaning product, a writing instrument, an adhesive product, a mount, a safety product, a first aid product, a survival product, a oral care product, a pair of eyeglasses, and an electronic component, such as batteries, chargers, and cables. The interior surface 305 of the pocket 300 is composed of a high friction material so as to more firmly secure a user's fingers or other components as they are inserted into the pocket 300.

Figure 7:
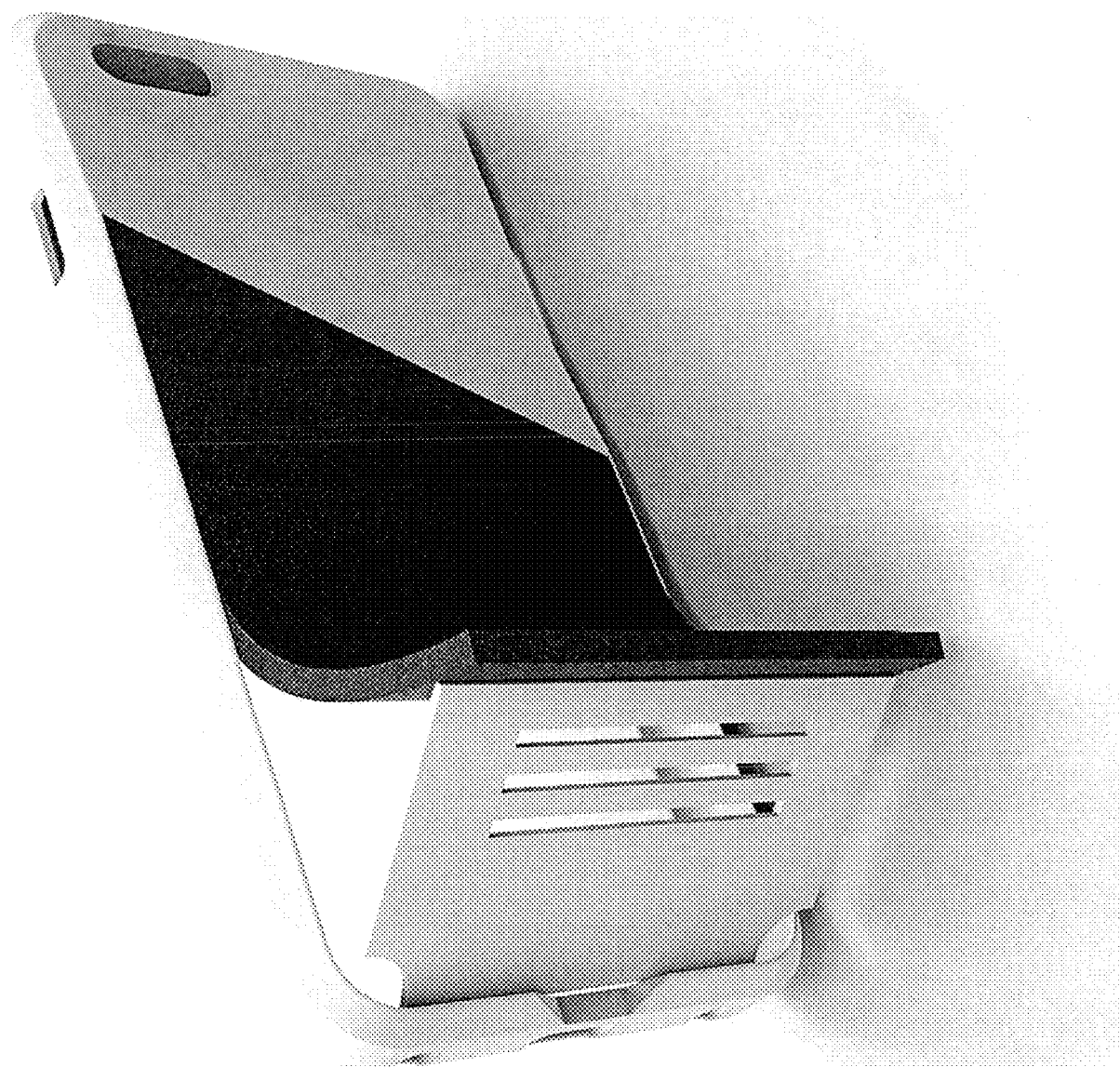
FIG. 7 is an isometric view of a back portion of the protective case for a personal electronic device, according to a second embodiment of the present invention

In an alternative embodiment shown in FIG. 7, the back portion 200 includes at least one pocket 400. The pocket 400 is disposed and integrated within the back portion 200. The pocket 400 includes a cover 402. Preferably, the cover 402 is secured to the back portion 200 with a hinge 403. Preferably, the hinge 403 is located at the periphery of the back portion 200 and located along the protective case 10 sides or ends. The pocket 400 may be made as a flap formed by slits in the back portion 200 or may be formed as a separate component entirely, attached to the back portion 200. In the event that the pocket is formed by slits in the back portion, the slits comprise: a first generally vertical slit 401 adjacent the left side portion 201, a second generally vertical slit 402 adjacent the right side portion 202, and a third generally horizontal slit 404 adjacent the bottom end portion 204. The vertical slits 401 and 402 extend only partway up the back portion 200 of the protective case 10, preferably about half way up the back portion 200. The vertical slits 401 and 402 terminate at the hinge 403.

As the size of user's fingers vary and items that may be stored in the pockets 300 or 400 come in varying shapes, sizes, and thicknesses, the pocket 300 or 400 can be composed of varying materials such as foam, rubber, silicone rubber, or other similar materials that offer both cushioning and frictional resistance to accommodate and frictionally securing objects of varying sizes. Preferably, this material is tacky on a top surface, a bottom surface, or both the top and bottom surface to allow for the retention of the items within the pocket 300, 400.

Note that the ways in which the invention is useful for operating the camera of a portable electronic device are also applicable to using the flashlight feature of a modern personal electronic device. Typically, the camera flash can be operated as a flashlight, and the present invention allows for a user to comfortably and dexterously operate the flashlight with a single hand with reduced fear of falling and damaging the device.

In an alternate embodiment (FIG. 7), the case includes a rigid mounting portion that is made of a rigid material that is disposed within an elastic backing. The rigid mounting is a fraction of the height of the elastic backing and hinges from an opposite side of the case as the elastic backing. Otherwise, all elements from the prior embodiments may be incorporated into the embodiment of FIG. 7.

The elastic backing has an opening on a bottom side for the insertion of a user's hand, as in the previous embodiment. Disposed under the elastic backing is the rigid mounting portion, which hinges from a lower end of the casing.

When the user's hand is disposed within the space between the elastic backing and rigid mounting portion, the rigid mounting portion is in an upright position flush with the sides of the case. The rigid mounting portion includes grooves and/or ridges to engage with and provide a frictional surface for the user's hand to engage.

The elastic backing may be made of a soft resin, a plastic, or a rubber that molds to the user's hand when placed within the space to allow for a snug and tight fit to secure the personal electronic device as the user moves his or her hand.

However, when the user's hand is not disposed in the space, the rigid mounting portion may be used in conjunction with the elastic backing to form a mounting for viewing the personal electronic device in either the vertical or horizontal position.

The rigid mounting portion is extendable into positions for standing the portable electronic device in either horizontal or vertical position for use when viewing the screen or for using the camera for photographing or recording.

In other words, the case includes a frame surrounding a primary space to receive a portable electronic device, the frame including an upper frame portion, a lower frame portion, and two side frame portions connecting the upper and lower frame portions; a resilient backing with an upper portion fixed to the frame and a free lower portion, the free lower portion allowing the resilient backing portion to be removed from a plane in which the frame is positioned in a rotational manner; a secondary space provided between the resilient backing and the primary space defined by the frame, the rotational movement of the free lower portion providing access to the secondary space; a rigid backing portion provided in the secondary space and including a hinged lower portion attached to the lower frame portion and a free upper portion that rotates out of the plane of the frame; wherein the rigid backing portion provided between the resilient backing and the primary space. The size of the secondary space is defined by the degree of rotation of the free lower portion of the resilient backing and the conformance the resilient backing to the shape of an object inserted into the secondary space, whether it be a user's hand or another object. The resilient backing and the rigid backing portion, when rotated out of the plane of the frame, join to make a generally triangular stand for the case that can be used to stand the case either vertically or horizontally. The free lower portion of the resilient backing is formed by slits along the two side frame portions and a slit along the lower frame portion, the slits along the two side portions each being shorter in length than the length of either side portion. The side slits may be connected by a structurally reinforced portion or by a hinged portion as seen in the previous embodiments.

Other additions to either embodiment include pins for a strap holder attached to the upper portion of the casing, and an elastic strap across the back of the case for holding the user's fingers or other materials in place.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) but that the invention will include all embodiments falling within the scope of the claims.

The invention claimed is:

1. A case for a portable electronic device comprising:
   a frame surrounding a primary space to receive a portable electronic device, the frame including an upper frame portion, a lower frame portion, and two side frame portions connecting the upper and lower frame portions;
   a resilient backing made of soft resin or rubber with an upper portion fixed to the frame and a free lower portion, the free lower portion allowing the resilient backing to be removed from a plane in which the frame is positioned;
   wherein the upper portion of the resilient backing remains parallel to the frame while the lower portion of the resilient backing detaches and curls away when an object is inserted into a secondary space provided between the resilient backing and the primary space defined by the frame, the detachment and curling away of the free lower portion providing access to the secondary space;
   a rigid backing portion provided in the secondary space and including a hinged lower portion attached to the lower frame portion and a free upper portion that rotates out of the plane of the frame;
   wherein the rigid backing portion is provided between the resilient backing and the primary space.

2. The case of claim 1, wherein the size of the secondary space is defined by the degree of rotation of the free lower portion of the resilient backing and the conformance the resilient backing to the shape of an object inserted into the secondary space.

3. The case of claim 1, wherein the resilient backing and the rigid backing portion, when rotated out of the plane of the frame, join to make a generally triangular stand for the case.

4. The case of claim 1, wherein the free lower portion of the resilient backing is formed by slits along the two side frame portions and a slit along the lower frame portion, the slits along the two side portions each being shorter in length than the length of either side portion.

5. The case of claim 4, wherein the slits along the two side portions are connected by a structurally reinforced portion.

6. The case of claim 4, wherein the slits along the two side portions are connected by a hinged portion.

* * * * *